No. 667,820. Patented Feb. 12, 1901.
W. G. ESCH.
TWINE HOLDER.
(Application filed Nov. 1, 1900.)
(No Model.)
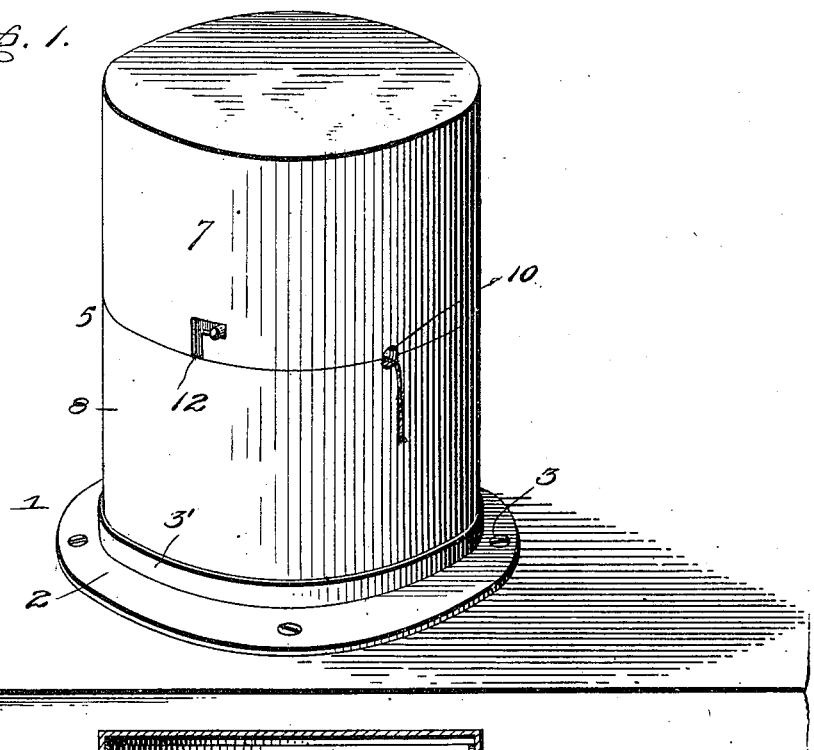
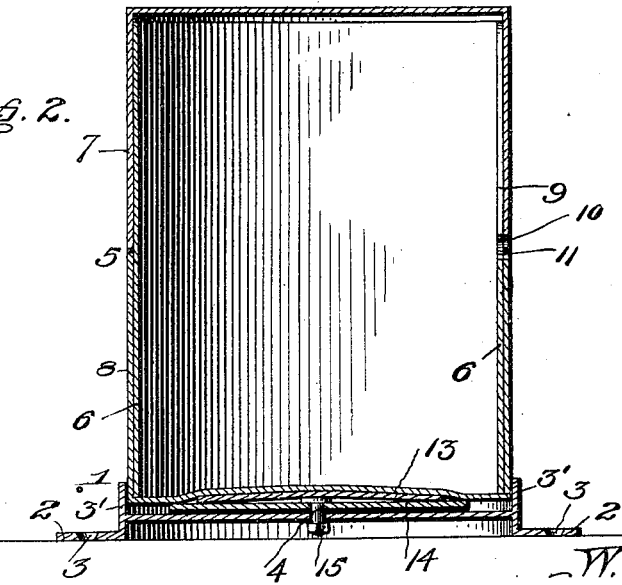
Witnesses
Inventor
W. G. Esch
By
Attorneys

UNITED STATES PATENT OFFICE.

WILLIAM G. ESCH, OF MANITOWOC, WISCONSIN.

TWINE-HOLDER.

SPECIFICATION forming part of Letters Patent No. 667,820, dated February 12, 1901.

Application filed November 1, 1900. Serial No. 35,170. (No model.)

*To all whom it may concern:*

Be it known that I, WILLIAM G. ESCH, a citizen of the United States, residing at Manitowoc, in the county of Manitowoc and State of Wisconsin, have invented certain new and useful Improvements in Twine-Holders; and I do declare the following to be a full, clear, and exact description of the invention, such as will enable others skilled in the art to which it appertains to make and use the same.

The invention relates to twine-holders, and more particularly to that class adapted to be placed upon a counter or shelf and, if desired, be secured thereto.

The object of the invention is to provide a device of this character which shall be simple of construction, durable in use, and comparatively inexpensive of production.

With this object in view the invention consists in certain features of construction and combination of parts, which will be hereinafter more fully set forth.

In the accompanying drawings, Figure 1 is a perspective view of my improved twine-holder, showing it attached to a counter; and Fig. 2 is a longitudinal vertical sectional view.

Referring to the drawings, 1 denotes the supporting-base of the twine-holder, having a supporting-flange 2, which may be provided with holes 3 for the purpose of inserting screws or nails when it is desired to secure the holder to a counter, shelf, or other support. The base is provided with an upwardly-extending annular shield-flange 3' and with a central aperture 4.

5 denotes the holder proper, which consists of two shells 6 and 7. The shell 6 is provided with an annular reinforcing-band 8 and a vertical slot 9, terminating in a semicircular recess 10, while the shell 7 is provided with a registering semicircular recess 11. These shells are connected by a bayonet-joint 12, and when one shell is locked to the other the two semicircular recesses register and form a twine orifice or eye.

13 and 14 denote two disks. A rivet is inserted through the lowermost one and has its head seated below the uppermost one. In this position the two disks are soldered or otherwise secured together and are then secured to the bottom of the lower shell. The lower end of the rivet projects through the central aperture in the base and, if desired, may be screw-threaded and provided with a nut 15.

The ball of twine is placed in the lower shell and its free end slipped down the vertical slot into the recess. The upper shell is now slipped on the lower shell and is given a slight twist to lock the parts together by the bayonet-joint. When locked, the two semicircular recesses register and form a guide-eye for the twine. The holder has a rotary movement at its base, and it will be found that for this reason the cord may be more easily unwound, as persons at different points may grasp the twine, and by pulling upon it the holder will revolve, so as to bring its guide-eye in direct line with the draft upon the cord. By providing the base with a guard-flange the twine will be prevented from slipping under the lower shell and becoming tangled up and wound around the rivet.

From the foregoing description, taken in connection with the accompanying drawings, the construction, operation, and advantages of my invention will be readily understood without requiring an extended explanation.

The device is exceedingly useful for the purpose for which it is designed and may be placed upon the market at a comparatively small cost.

Various changes in the form, proportion, and the minor details of construction may be resorted to without departing from the principle or sacrificing any of the advantages of this invention.

Having thus fully described my invention, what I claim as new, and desire to secure by Letters Patent, is—

A twine-holder consisting of the following elements: a supporting-base provided with a central aperture and a vertically-extending annular flange, two shells releasably connected together and provided with a twine guide-eye, the lowermost shelf having its bottom bulged upwardly and a plate secured to said bottom, a disk arranged below said plate and a rivet having its head confined between said disk and said plate and extending through the perforation in the base, substantially as and for the purpose set forth.

In testimony whereof I have hereunto set my hand in presence of two subscribing witnesses.

WILLIAM G. ESCH.

Witnesses:
CHAS. HOEFNER,
ARTHUR ENGELBRECHT.